United States Patent [19]

Padget et al.

[11] Patent Number: 5,039,739

[45] Date of Patent: Aug. 13, 1991

[54] AQUEOUS DISPERSION OF A POLYURETHANE HAVING PENDENT FLUOROALKYL GROUPS

[75] Inventors: John C. Padget, Frodsham; Stephen G. Yeates, Macclesfield, both of England; Richard G. Coogan, North Reading, Mass.; Gerardus C. Overbeek, Sprang-Capell, Netherlands

[73] Assignees: Imperial Chemical Industries PLC, London, England; ICI Americas, Inc., Wilmington, Del.; ICI Resins BV

[21] Appl. No.: 343,206

[22] Filed: Apr. 26, 1989

[30] Foreign Application Priority Data

Apr. 26, 1988 [GB] United Kingdom ............... 8809864

[51] Int. Cl.$^5$ ............................................. C08L 75/04
[52] U.S. Cl. .................................. 524/839; 524/840; 524/591
[58] Field of Search ............... 524/589, 839, 840, 591

[56] References Cited

U.S. PATENT DOCUMENTS

| 3,380,943 | 4/1968 | Enders et al. | 524/589 |
| 3,879,490 | 4/1975 | Villa | 525/122 |
| 3,880,949 | 4/1975 | Villa | 525/122 |
| 3,968,066 | 7/1976 | Mueller | 528/67 |
| 4,054,592 | 10/1977 | Dear et al. | 528/70 |
| 4,098,742 | 7/1978 | Mueller | 528/29 |
| 4,158,672 | 6/1979 | Dear et al. | 528/70 |

*Primary Examiner*—John Kight, III
*Assistant Examiner*—Dennis R. Daley
*Attorney, Agent, or Firm*—Cushman, Darby & Cushman

[57] ABSTRACT

An aqueous dispersion of a water-dispersible polyurethane having pendent fluoroalkyl groups, said polyurethane being the product of chain extending, in aqueous medium, a water-dispersible, isocyanate-terminated polyurethane prepolymer having pendent fluoroalkyl groups.

5 Claims, No Drawings

AQUEOUS DISPERSION OF A POLYURETHANE HAVING PENDENT FLUOROALKYL GROUPS

This invention relates to polyurethanes and more particularly to water-dispersible polyurethanes based on fluorine-containing polyols and to aqueous dispersions of said polyurethanes.

Aqueous polyurethane dispersions are well known and are used in the production of useful polyurethane products, for example coatings, films, adhesives and the like. Such dispersions are usually produced by dispersing a water-dispersible, isocyanate-terminated polyurethane prepolymer in an aqueous medium in conjunction with an active hydrogen containing chain extender such as a diamine.

The prepolymers used in the preparation of the dispersions are generally obtained by reacting an excess of a polyisocyanate component with an isocyanate-reactive component comprising an active hydrogen containing polymer and, to provide water-dispersibility, an isocyanate-reactive compound containing an ionic or nonionic hydrophilic centre.

The active hydrogen containing polymer used in the preparation of the prepolymers is usually a polyether or polyester polyol but it has now been found that when certain fluorine containing isocyanate-reactive compounds are used in the preparation of the prepolymer, the resulting aqueous dispersions can provide urethane coatings having very low surface energy, high water and oil repellency, improved scratch resistance and improved lubricity.

Accordingly, the present invention provides an aqueous dispersion of a water-dispersible polyurethane having pendent fluoroalkyl groups, said polyurethane being the product of chain extending, in aqueous medium, a water-dispersible, isocyanate-terminated polyurethane prepolymer having pendent fluoroalkyl groups.

In general, the prepolymer will be a product obtainable by reacting a stoichiometric excess of an organic polyisocyanate with an isocyanate-reactive component containing at least one compound having a plurality of isocyanate-reactive groups and at least one pendent fluoroalkyl group.

The water-dispersibility of the prepolymer may arise from the use of external dispersing agents in known manner but is preferably due to the use of internal dispersing agents formed by the inclusion in the prepolymer preparation of a compound containing a hydrophilic centre and at least two isocyanate or isocyanate-reactive groups.

The polyisocyanate used in making the prepolymer may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, m- and p-tetramethylxylene diisocyanates, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

Especially useful prepolymer may be obtained by reacting an organic polyisocyanate with an organic polyol having pendent fluoroalkyl groups and a compound containing a hydrophilic centre and at least two isocyanate or isocyanate-reactive groups.

Suitable polyols having pendent fluoroalkyl groups include polyols having pendent groups of the formula:

(1)

wherein Y represents F and Z represents Cl or $F(CF_2)_n$- wherein n is an integer from 0 to 10 or Y and Z together form a $-(CF_2)_m$- chain wherein m represents an integer from 2 to 4 and x is a positive integer which must be 1 when E is not F.

Such fluorine-containing polyols may be obtained by the free radical addition of a fluoro-olefin having the general formula:

(2)

wherein Y and Z are as defined above to a polyol containing one or more residues of the formula:

(3)

wherein p is an integer of at least 4.

Fluoro-olefins of formula (2) which may be used in the preparation of the fluorine-containing polyols include tetrafluoroethene, chlorotrifluoroethene, hexafluoropropene, perfluorinated nonene-1, hexafluorocyclobutene, octafluorocyclopentene and decafluorocyclohexene.

Examples of polyols containing at least one residue of formula (3) include 1,4-butanediol, 1,6-hexanediol and 1,10-decanediol, and polyesters derived therefrom.

Particularly useful polyols containing a plurality of residues of formula (3) for use in making the fluorine-containing polyols include polytetramethylene glycols such as may be prepared by the polymerisation of tetrahydrofuran in the presence of an acidic catalyst such as boron trifluoride. The polytetramethylene glycols suitably have molecular weights in the range from 162 to 5000, especially from 500 to 3000 and more especially from 650 to 2000.

The free radical addition of the fluoro-olefin of formula (2) to the polyol is performed under conditions in which free radicals are generated. Such conditions have been fully described in the prior art and include the use of known free radical generators, for example azo compounds and peroxy compounds such as the peroxides, persulphates, percarbonates and perborates as well as ultra-violet and gamma radiation. Di-t-butyl peroxide has been found to be particularly effective.

The free radical addition may be carried out at normal or elevated temperatures, for example temperatures up to 200° C. Solvents are not usually necessary when the polyol is a liquid at the reaction temperature but inert solvents may be used when required. Separation of the reaction product from any remaining starting materials and any solvent used may be effected using conventional techniques.

The fluorine content of the fluorine-containing polyols may be varied by varying the constitution and/or amount of the fluoro-olefin and/or by varying the free radical addition conditions. In general, the fluorine-containing polyols should have a fluorine content in the range from 5 to 60% on a weight basis, although the possibility of using polyols having lower or higher fluorine contents is not excluded.

Products obtained by the addition of the fluoro-olefins to non-polymeric polyols may contain, on average, up to 1 or even more groups of Formula 1 per polyol molecule. Polymeric fluorine-containing polyols, for example polyether polyols, may contain, on average, up to 1 or more groups of Formula 1 per monomer residue.

As examples of other compounds containing a plurality of isocyanate-reactive groups and at least one pendent fluoroalkyl group, there may be mentioned the dialcohols containing perfluoroalkyl groups described in column 3 of U.S. Pat. No. 4,540,765 and the diols disclosed in columns 3, 4 and 5 of U.S. Pat. No. 4,046,944. Further such compounds may be obtained by reacting a fluorinated monomer of the types described in U.S. Pat. No. 3,645,989 and 4,147,851 with a primary alkanolamine such as ethanolamime or isopropanolamine or a secondary alkanolamine such as diethanolamine or di-isopropanolamine.

Mixtures of fluorine-containing polyols may be used, for example mixtures of polyols having different fluorine contents and/or different molecular weights.

Compounds containing a hydrophilic centre and at least two isocyanate or isocyanate-reactive groups which may be used in the preparation of the prepolymer in order to provide water-dispersibility have been fully described in the prior art and may be of the ionic, ionic precursor or nonionic type.

Compounds containing an ionic hydrophilic centre and at least two isocyanate or isocyanate-reactive groups particularly include polyols and polyamines containing ionic groups which may be cationic, for example quaternary ammonium, quaternary phosphonium or ternary sulphonium salt groups, or anionic, for example salts of sulpho, sulphato, thiosulphato, phospho, phosphono, phosphato or, preferably, carboxy groups. Compounds containing ionic precursor groups are compounds which contain groups such as carboxylic acid or tertiary amino groups which may readily be converted to ionic groups by simple chemical reactions such as neutralisation or quaternisation.

Specific examples of compounds containing ionic precursor groups and two or more isocyanate-reactive groups include triethanolamine and N-methyldiethanolamine and their oxyalkylation and polyesterification products, trimethylolpropane monophosphate and monosulphate, bis-hydroxymethylphosphinic acid, diaminocarboxylic acids, for example, lysine, cystine and 3,5-diaminobenzoic acid, 2,6-dihydroxybenzoic acid and especially dihydroxyalkanoic acids, for example 2,2-dimethylolpropionic acid.

Compounds containing a nonionic hydrophilic centre and at least two isocyanate or isocyanate-reactive groups include diols and/or diisocyanates having pendent polyoxyethylene chains.

Diols having pendent polyoxyethylene chains which may be used in the preparation of the prepolymer include those described in the prior art, for example in U.S. Pat. No. 3905929. These diols, because of their function, may be regarded as dispersing diols. Particularly suitable dispersing diols may be obtained by reacting one mole of an organic diisocyanate in which the two isocyanate groups have different reactivities with approximately one mole of a polyethylene glycol monoether and then reacting the adduct so obtained with approximately one mole of a dialkanolamine, for example diethanolamine.

Diisocyanates having groups of different reactivity which may be used in the preparation of the dispersing diols include 2,4-toluene diisocyanate, isophorone diisocyanate and 2,4'-diphenylmethane diisocyanate. Polyethylene glycol monoethers which may be used include the reaction products of ethylene oxide with monohydric alcohols such as methanol, ethanol, tertiary butanol or benzyl alcohol or phenols such as phenol itself. The polyethylene glycol monoethers suitably have molecular weights in the range 250 to 3000 and preferably in the range 500 to 2000.

If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The preparation of the dispersing diols may be achieved by adding the polyethylene glycol monoether to the diisocyanate at 20–50° C., optionally in the presence of an inert solvent and a urethane catalyst, followed by addition of the dialkanolamine.

Diisocyanates having pendent polyoxyethylene chains which may be used in the preparation of the prepolymer include those described in the prior art, for example in U.S. Pat. No. 3920598. These diisocyanates, because of their function, may be regarded as dispersing diisocyanates. Particularly suitable dispersing diisocyanates may be obtained by reacting two moles of an organic diisocyanate in which the two isocyanate groups have different reactivities with approximately one mole of a polyethylene glycol mono-ether, the initially formed urethane monoisocyanate then reacting at a higher temperature with the excess diisocyanate to form an allophanate diisocyanate having a pendent polyoxyethylene chain.

Suitable diisocyanates and polyethylene glycol monoethers for use in preparing the dispersing diisocyanates have been mentioned above for the preparation of the dispersing diols.

Other compounds containing a nonionic hydrophilic centre and at least two isocyanate-reactive groups may be obtained by reacting one mole of a primary amine of the formula:

$$R^1O(CH_2CHO)_mZNH_2 \quad (4)$$
$$\phantom{R^1O(CH_2C}|$$
$$\phantom{R^1O(CH_2CHO)_m}R_2$$

wherein $R^1$ represents a monovalent hydrocarbon radical containing 1–12 carbon atoms,;

$R^2$ represents hydrogen or a mixture thereof with methyl and/or ethyl, at least 40% of the $R^2$ substituents in said mixture being hydrogen, m is an integer from 5 to 150, and Z represents an alkylene radical containing 2–4 carbon atoms, with (1) one or more moles of at least one $C_2$–$C_4$ alkylene oxide, preferably ethylene oxide, or (2) one or two moles of an unsaturated compound of the formula:

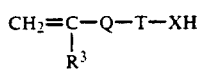 (5)

or (3) one half mole of an unsaturated compound of the formula:

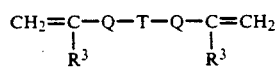 (6)

wherein $R^3$ represents hydrogen, halogen or $C_{1-4}$- alkyl,

Q represents a divalent electron-withdrawing group,

T represents a divalent hydrocarbon radical which may carry substituents or contain hetero atoms, and XH represents an isocyanate-reactive group.

Primary amines of Formula 4 are commercially available. Examples of such amines wherein Z is 1,2-propylene are the Jeffamine polyoxyalkyleneamines available from the Texaco Chemical Company. Amines where Z is trimethylene may be obtained by the cyanoethylation of polyalkylene glycol mono-ethers followed by hydrogenation.

Examples of unsaturated compounds of Formula 5 particularly include 2-hydroxyethyl and 2-hydroxypropyl acrylates and methacrylates.

Examples of unsaturated compounds of Formula 6 especially include diacrylates and dimethacrylates wherein T is a $C_{4-10}$- alkylene residue, a polyoxyalkylene residue or an oxyethylated Bisphenol A residue.

The water-dispersible, isocyanate-terminated polyurethane prepolymers of the invention may be prepared in conventional manner by reacting a stoichiometric excess of the organic polyisocyanate with the fluorine-containing isocyanate reactive compound and the compound containing a hydrophilic centre under substantially anhydrous conditions at a temperature between about 30° C. and about 130° C. until reaction between the isocyanate groups and the active hydrogen groups is substantially complete. The polyisocyanate and the active hydrogen containing components are suitably reacted in such proportions that the ratio of number of isocyanate groups to the number of isocyanate-reactive groups is in the range from about 1.1:1 to about 6:1, preferably within the range of from 1.5:1 to 3:1.

If desired, catalysts for urethane formation such as dibutyltin dilaurate and stannous octoate may be used to assist prepolymer formation and a non-reactive solvent may be added before or after prepolymer formation to control the viscosity. Suitable solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone. Other suitable solvents include vinyl monomers which can be subsequently polymerised.

In addition to the polyol having pendent fluoroalkyl groups and the compound containing a hydrophilic centre, one or more other compounds containing a plurality of isocyanate-reactive groups may be used in preparing the prepolymer if desired. When additional isocyanate reactive compounds are used, the overall ratio of isocyanate groups to isocyanate reactive groups should, in general, conform to the ranges given above.

Suitable additional isocyanate-reactive compounda include fluorine-free organic polyols having molecular weights in the range 62 to 6000. Such polyols particularly include diols and triols and mixtures thereof but higher functionality polyols may be used for example as minor components in admixture with diols. The polyols may be polymeric polyols having molecular weights in the range 400 to 6000 or low molecular weight polyols having molecular weights below 400 depending upon the degree of flexibility required in the final polyurethane product. Mixtures of polymeric and/or low molecular weight fluorine-free polyols may be used.

Fluorine-free polymeric polyols having molecular weights in the range 400–6000 which may be used in the preparation of the prepolymer may be members of any of the chemical classes of polymeric polyols used or proposed to be used in polyurethane formulations. In particular, the polyols may be polyesters, polyesteramides, polyethers, polythioethers, polycarbonates, polyacetals, polysiloxanes or polyolefins. Preferred polyol molecular weights are from 700 to 3000.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof, with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerisation of lactones, for example caprolactone, in conjunction with a polyol may also be used. Polyesteramides may be obtained by the inclusion of amino-alcohols such as ethanolamine in polyesterification mixtures.

Polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol and hexanediol with formaldehyde. Suitable polyacetals may also be prepared by polymerising cyclic acetals.

Suitable polyolefin polyols include hydroxy-terminated butadiene homo- and copolymers.

Fluorine-free organic polyols having molecular weights below 400 which may be used in the preparation of the prepolymer particularly include ethylene glycol, diethylene glycol, tetraethylene glycol, bis(hydroxyethyl) terephthalate, cyclohexane dimethanol, furan dimethanol, glycerol and the reaction products, up to molecular weight 399, of such polyols with propylene oxide and/or ethylene oxide.

Aqueous polyurethane dispersions may be prepared by dispersing the water dispersible, isocyanate-terminated polyurethane prepolymer in an aqueous medium and chain extending the prepolymer with an active hydrogen containing chain extender.

The prepolymer may be dispersed in water using techniques well known in the art. Preferably, the prepolymer is added to the water with agitation or, alternatively, water may be stirred into the prepolymer.

Conversion of any ionic precursor groups, for example carboxy groups, in the prepolymer to ionic (salt) groups may be effected before, simultaneously with, or after the addition of the prepolymer to water. The agent used to effect neutralisation of a carboxy group may suitably be a tertiary amine such as triethylamine, triethanolamine or N-methylmorpholine, an alkaline hydroxide such as sodium or potassium hydroxide or a quaternary ammonium hydroxide.

The active hydrogen containing chain extender which is reacted with the prepolymer is suitably a polyol, an amino alcohol, ammonia, a primary or secondary aliphatic, alicyclic, aromatic, araliphatic or heterocyclic amine especially a diamine, hydrazine or a substituted hydrazine. Water-soluble chain extenders are preferred, and water itself may be effective.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris(2-aminoethyl) amine, 3,3'-dinitrobenzidine, 4,4'-methylenebis(2-chloroaniline), 3,3'-dichloro-4,4'bi-phenyl diamine, 2,6-diaminopyridine, 4,4'-diaminodiphenylmethane, menthane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above.

Where the chain extender is other than water, for example a diamine or hydrazine, it may be added to the aqueous dispersion of prepolymer or, alternatively, it may already be present in the aqueous medium when the prepolymer is dispersed therein.

The chain extension can be conducted at elevated, reduced or ambient temperatures. Convenient temperatures are from about 5° to 95° C. or more, preferably from about 10° to about 45° C.

The amount of chain extender employed should be approximately equivalent to the free-NCO groups in the prepolymer, the ratio of active hydrogens in the chain extender to NCO groups in the prepolymer preferably being in the range from 1.0 to 2.0:1. Of course, when water is employed as the chain extender, these ratios will not be applicable since the water, functioning both as chain extender and dispersing medium, will be present in gross excess relative to the free-NCO groups.

It will be appreciated by those skilled in the art that the water-dispersible polyurethane may be either linear, branched or crosslinked in structure depending upon the components used in its formation. Polyurethanes having a degree of branching of up to one crosslink for each 3000 atomic weight units are of greatest interest.

The aqueous dispersions of the invention may be advantageously employed as coating compositions, for which purpose they may be further diluted with water and/or organic solvents, or they may be supplied in more concentrated form by evaporation of water and/or organic components of the liquid medium. As coating compositions, they may be applied to any substrate including wood, metals, glass, cloth, leather, paper, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently. It is possible to include an amount of an antimony oxide in the dispersions to enhance the fire retardant properties. The dispersions may also be used as adhesives for materials such as polypropylene, polyester, polyurethane, leather and the like or as binding agents for various particulate materials.

The dispersions suitably have solids contents of from about 20 to 60% by weight.

If desired, the polyurethane dispersions of the invention may be used in admixture with other dispersions, for example dispersions of vinyl polymers and copolymers.

Thus, in a still further aspect of the invention, there is provided an aqueous polymer dispersion containing a water-dispersible polyurethane and a vinyl polymer, the polyurethane being the product of reacting (a) a water-dispersible, isocyanate-terminated polyurethane prepolymer formed by reacting an organic polyisocyanate with an organic polyol having pendent fluoroalkyl groups, a compound containing a hydrophilic centre and at least two isocyanate or isocyanate-reactive groups and optionally one or more polyols having a molecular weight in the range 62 to 6000 and being free from fluorine atoms and hydrophilic centres, and (b) an active hydrogen containing chain extender.

The aqueous polymer dispersions may be prepared by simply blending an aqueous dispersion of a water-dispersible polyurethane as described above with an aqueous dispersion of a vinyl polymer. It is especially preferred, however, to polymerise one or more vinyl monomers in the presence of the aqueous polyurethane dispersion. This may be effected by adding the vinyl monomer or monomers to the polyurethane dispersion, either gradually or all at once, and subjecting the monomer to polymerisation conditions during and/or after its addition to the dispersion. Alternatively, a solution of prepolymer in vinyl monomer may be dispersed in an aqueous medium after which the prepolymer is chain extended and the vinyl monomer polymerised.

Vinyl monomers which may be polymerised to form the vinyl polymer component of the aqueous dispersions of the invention include any radically polymerisable olefinically unsaturated compounds or mixtures thereof. Thus, there may be mentioned hydrocarbon monomers, for example butadiene, isoprene, styrene and divinyl benzene, acrylic and substituted acrylic monomers, for example acrylic and methacrylic acids, acrylonitrile, methyl, ethyl, 2-hydroxyethyl, butyl and isobutyl acrylates and methacrylates, acrylamide, methacrylamide, N-methylolacrylamide and other commonly used monomers such as vinyl chloride, vinylidene chloride, vinyl esters, vinyl ethers, vinyl ketones and heterocyclic vinyl compounds. The preferred vinyl monomers are those giving homopolymers or copolymers having a Tg lower than that of the polyurethane hard segment.

Polymerisation of the vinyl monomer or monomers may be effected using conventional polymerisation techniques. Thus, the monomer may be contacted with free radical initiators, for example organic phase initiators such as azodiisobutyronitrile or initiators partitioned between the aqueous and organic phases, for example a combination of t-butylhydroperoxide, isoascorbic acid and Fe.EDTA or water-soluble initiators such as persulphates.

The weight ratio of polyurethane to vinyl polymer in the dispersions of the invention is suitably in the range from 90:10 to 10:90, preferably from 80:20 to 20:80, and more preferably from 70:30 to 30:70 with a solids content in the range from about 30% to about 45% by weight. Viscosities are usually between 20 and 1000 cps at 25° C. and the pH is commonly around 7.5 to 9.0.

The aqueous polymer dispersions containing vinyl polymer may be utilised for purposes similar to those described for the unmodified polyurethane dispersions. Thus, they may be used as coating compositions, adhesives, binding agents and the like. The effect of the vinyl polymers is to optimise the low surface energy properties referred to above.

Surprisingly, it has been found that when the polyurethane/vinyl polymer dispersions of the invention are blended with other aqueous polymer dispersions in weight ratios of 1:99 to 99:1, especially 5:95 to 95:5, the derived films still have low surface energy. The other polymer dispersion can be, for example a vinyl polymer dispersion or a non-fluorinated polyurethane dispersion. The invention is illustrated but not limited by the following Examples:

EXAMPLE 1

Isophorone isocyanate (100 g), 2,2-dimethylolpropionic acid (11 g) a fluorinated diol having a hydroxyl number of 74 and a fluorine content of 36.4% by weight (65.7 g) and N-methylpyrrolidone (31.2 g) were charged to a flask and heated with stirring under nitrogen to 60° C. Dibutyltin dilaurate (1.18 g as a 10% solution in N-methylpyrrolidone) was added and the temperature was allowed to rise to 90-95° C. After 1 hour at this temperature, further dibutyltin dilaurate (1.18 g) was added and the reaction was continued at the same temperature for a further 4 hours by which time the NCO content indicated completion for the reaction.

The reaction mixture was then cooled to 70-75° C. and the carboxylic acid groups were neutralised by stirring in triethylamine (7.4 g) for 30 minutes.

The neutralised prepolymer so prepared (175.5 g) was held at a temperature of 60° C. and added to distilled water (350 g) at 20° C. over 30 minutes with mild agitation. Hydrazine monohydrate (5.59 g.) was then added to chain extend the prepolymer.

The resulting aqueous dispersion containing no coagulum had a solids content of 26.8% and a pH of 7.32, the average particle size being 0.062 $\mu$m. A film made by drying the dispersion at 100° C. for 16 hours had a surface energy of 38 dyne cm$^{-1}$ at 20° C.

The fluorinated diol used in this Example had pendent 1,1,2,3,3,3-hexafluoropropyl groups and was made by the free radical addition of hexafluoropropene to polytetrahydrofuran of molecular weight 650 at 140° C.

EXAMPLE 2

The aqueous dispersion made as described in Example 1 (150 g) and distilled water (105 g) were charged to a flask and heated to 75±1° C. A 3.5% by weight aqueous solution of t-butyl hydroperoxide (8.61 g) was then added. Addition of the monomers (24.12 g butyl acrylate, 36.18 g methyl methacrylate and 1 drop triethanolamine) and a 1% by weight aqueous solution of isoascorbic acid (18.09 g) was started simultaneously, the monomers being added over 30 minutes and the isoascorbic acid solution over 40 minutes.

The polymerisation was allowed to proceed for a total of 2 hours before cooling and filtering through a 50$\mu$m mesh to give a dispersion having a urethane acrylate weight ratio of 2:3.

The resulting dispersion containing no coagulum had the following properties:

| | |
|---|---|
| Particle size | 0.095 $\mu$m |
| pH | 7.02 |
| Minimum film-forming temperature | 11.6° C. |
| % Solids | 27.7 |
| % Conversion | 95 |
| Surface Energy of film (dried at 100° C./16 hours) | 32.5 dyne cm$^{-1}$ |

EXAMPLE 3

The aqueous dispersion made as described in Example 2 was blended with a standard anionic polyurethane dispersion of composition IPDI/DMPA/pTHF1000/pTHF2900/hydrazine=42/6.5/42.4/9.1/14.9 (a) and characterised by:

| | |
|---|---|
| Particle size | 0.089 $\mu$m |
| pH | 6.9 |
| % Solids | 21.6 |
| Surface Energy of film (dried at 100° C./16 hours) | 44 dyne cm$^{-1}$ |

Films were cast and dried at 100° C./16 hurs and the surface energy of the blend films determined. Results obtained were:

| Example 2/PUR(A) (w/w) | Surface energy dyne cm$^{-1}$ at 20° C. |
|---|---|
| 5/95 | 33.5 |
| 25/75 | 32.5 |

EXAMPLE 4

(A) Preparation of Perfluorinated Monomer (I)

Into a resin flask under $N_2$ was added 130 g of a compound of the formula:

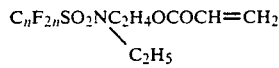

$$C_nF_{2n}SO_2NC_2H_4OCOCH=CH_2$$
$$\quad\quad\quad\quad\; \backslash C_2H_5$$

wherein n has an average value of 7.5 which was dissolved in 113g acetone at room temperature. 11.80g of ethanolamine was added to the flask which was heated to 65° C.

Progress of the reaction was monitored by both IR and IH NMR, complete reaction being observed after 2½ hours. Flask was then cooled to room temperature and the contents shaken with 100 g distilled water for 30 minutes. The lower fluorointermediate (I) containing layer was decanted off and dried over anhydrous calcium sulphate for 24 hours. Product was recovered by filtration and rotary evaporation of the acetone to yield a slowly free flowing yellow product. Structure was confirmed by 'NMR', IR, mass spec and shown to by >95% I by GC/mass spec.

(B) Preparation of Perfluorinated Polyurethane F

Into a resin flask under nitrogen was charged 6.5 g of dimethylolpropionic acid, 20 g polycaprolactone 530, 21.5 g polycaprolactone 1250, 10 g intermediate I, 42.85 N-methylpyrrolidone, 42g isophorone diisocyanate and 1.5 g of dibutyltindilaurate (10% in N-methylpyrrolidone). The mixture was heated to 88–92° C. for 4 hours after which the free NCO was determined to be 4.2%. After the reaction was complete 4.7 g of triethylamine was added to the prepolymer. The prepolymer solution was dispersed into water over a thirty minute period. The dispersion was allowed to stir for 5 minutes, then 2.8 g of hydrazine monohydrate was added. The dispersion had a solids content of 24.8 % w/w, pH of 6.5 and a particle size of 30 nm. All measurements @25° C. $\gamma_c$:films cast RT/ON+60° C./30 minutes.

| Code | NCO/OH | DIOL | wt-% DMPA | wt-% I | $\gamma c$ dyne cm$^{-1}$ | $\gamma$ dispersion dyne cm$^{-1}$ |
|---|---|---|---|---|---|---|
| A | 1.6 | pTHF | 6.5 | 0 | 44 | 38 |
| B | 1.6 |  | 6.5 | 0.5 | 17 | 33.9 |
| C | 1.6 |  | 6.5 | 1.0 | 17 | 34.2 |
| D | 1.6 |  | 6.5 | 2.5 | 17 | 32.8 |
| E | 1.6 | pCap | 6.5 | 0 | 40 | 37 |
| F | 1.6 |  | 6.5 | 10 | 13.5 | 28 |

We claim:

1. An aqueous dispersion of a water-dispersible polyurethane having pendent fluoroalkyl groups, said polyurethane being the product of chain extending, in aqueous medium, a water-dispersible, isocyanate-terminated polyurethane prepolymer obtained by reacting a stoichiometric excess of an organic polyisocyanate with an isocyanate-reactive component containing at least one organic polyol having pendent fluoroalkyl groups, said polyol being a product obtained by the free radical addition of a fluoro-olefin having the general formula:

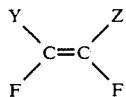

wherein Y represents F and Z represents Cl or $F(CF_2)_n$- wherein n is an integer from 0 to 10, or Y and Z together form a $-(CF_2)_m$-chain wherein m represents an integer from 2 to 4 and x is a positive integer which must be 1 when Z is not F, to a polytetramethylene glycol having a molecular weight in the range from 162 to 5,000.

2. A dispersion according to claim 1 wherein said fluoro-olefin is tetrafluoroethene, chlorotrifluoroethene or hexafluoropropene.

3. A dispersion according to claim 1 wherein said prepolymer is a product obtained by reacting said organic polyisocyanate with said organic polyol having pendent fluoroalkyl groups and a compound containing a hydrophilic centre and at least two isocyanate or isocyanate-reactive groups.

4. A dispersion according to claim 3 comprising a water-dispersible polyurethane and a vinyl polymer, the polyurethane being the product of reacting (a) a water-dispersible, isocyanate-terminated polyurethane prepolymer formed by reacting said organic polyisocyanate with said organic polyol having pendent fluoroalkyl groups, said prepolymer comprising a hydrophilic centre and at least two isocyanate or isocyanate-reactive groups and optionally one ore more polyols having a molecular weight in the range 62 to 6,000 and being free from fluorine atoms and hydrophilic centres, and (b) an active hydrogen containing chain extender.

5. A coating or film derived from an aqueous dispersion according to claim 1.

* * * * *